United States Patent [19]

Schaff Deleury et al.

[11] Patent Number: 4,740,117

[45] Date of Patent: Apr. 26, 1988

[54] FIXING BUSHING ASSEMBLY FOR A MACHINING UNIT AND A MACHINING UNIT ADAPTED TO COOPERATE WITH SAID BUSHING

[75] Inventors: Marie-José Schaff Deleury, Toulouse; Alain Brail, Colomiers, both of France

[73] Assignee: Aerospatiale Societe Nationale Industrielle, France

[21] Appl. No.: 917,658

[22] Filed: Oct. 9, 1986

[30] Foreign Application Priority Data

Oct. 16, 1985 [FR] France ................ 85 15326

[51] Int. Cl.$^4$ ............................................. B23B 45/14
[52] U.S. Cl. .................... 408/72 R; 408/72 B; 408/115 B; 408/241 B
[58] Field of Search ............... 408/72 B, 115 B, 75, 408/241 B, 95; 409/218

[56] References Cited

U.S. PATENT DOCUMENTS

| | | | |
|---|---|---|---|
| 3,108,500 | 10/1963 | Merriman | 408/115 B X |
| 3,591,307 | 6/1969 | Barnard | 408/241 B |
| 3,756,736 | 9/1973 | Marcoux | 408/72 B X |
| 3,981,604 | 9/1976 | Cenis | 408/72 B |
| 4,507,026 | 3/1985 | Lund | 408/72 B |

Primary Examiner—Z. R. Bilinsky
Attorney, Agent, or Firm—McGlew and Tuttle

[57] ABSTRACT

The assembly comprises in combination a fixing bushing (3) and a machining unit (6), the bushing being adapted to receive the nose of the machining unit which comprises the nose and a body. The bushing (3) comprises at its inlet mouth (9) inner guide means (13) and outer hooking means (14) and, internally, means (18, 19) for centering the machining unit (6). The unit comprises hooking elements (27) adapted to cooperate with the hooking means (14) of the bushing and slidable means (30) for locking the hooking elements (27).

7 Claims, 3 Drawing Sheets

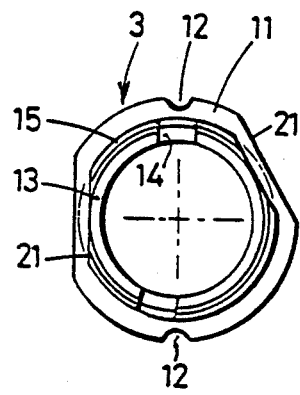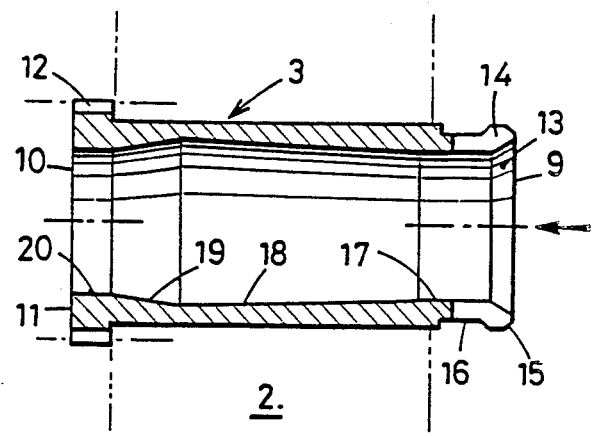
FIG. 3  FIG. 2
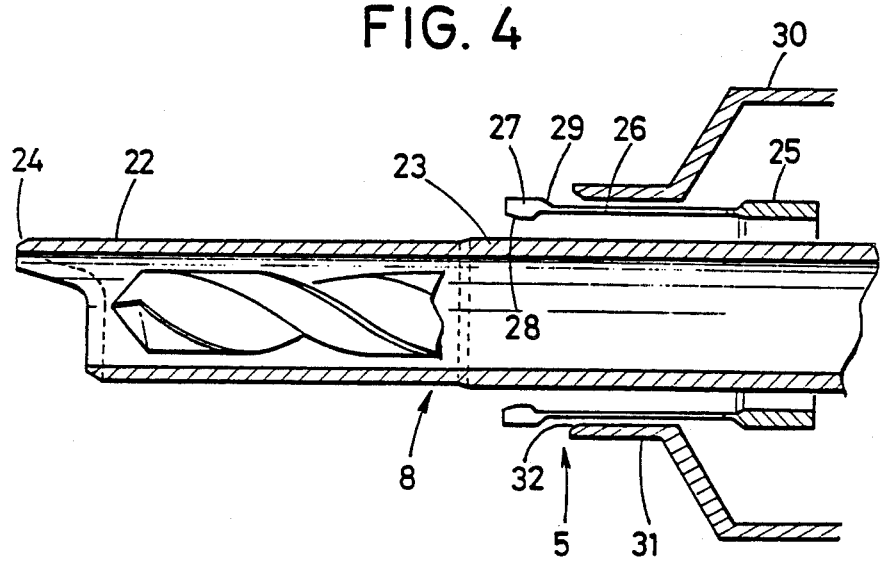
FIG. 4

FIXING BUSHING ASSEMBLY FOR A MACHINING UNIT AND A MACHINING UNIT ADAPTED TO COOPERATE WITH SAID BUSHING

The present invention relates to automatic apparatus employed in industry for effecting repetitive machining operations by means of individually handled work units and it more particularly relates to an improved assembly for facilitating the presentation and positioning of said units.

There are extensively employed in the automatized production lines of mechanical parts for various industries such as the automobile, aeronautic and other industries, automatic installations designed to effect repetitive operations such as drilling, milling, boring, piercing or other operations by means of a plurality of apparatus or units which are handled so as to be presented and engaged in fixing bushings which are previously fixed to a jig or grid fixed against the workpiece to be machined for the purpose of performing the required operations thereon.

For example, when the workpieces must be provided with a large number of drilled holes in a given arrangement, there is fixed against this workpiece a jig carrying bushings in a corresponding arrangement and an operator adapts the drilling units in several of these bushings and then moves them so as to adapt them in other bushings as the various units have terminated their work cycle which is controlled automatically.

Each unit comprises a nose which must be presented in front of a bushing, centered, introduced and locked in the latter, usually by turning the unit a quarter of a turn in the bushing.

The automatization of this handling has encountered difficulties due, on one hand, to the internal geometry of the present bushings which prevents the introduction of the nose of the unit when an offset, even a minute offset, exists between the axis of the unit and the axis of the bushing, the latter being devoid of centering means and, on the other hand, to the impossibility of a repeat due to the absence of a fixed positioning as concerns rotation.

Further, the overall size of the bushings does not always allow them to be disposed at the place of each hole when the holes are too close together and it is consequently necessary to employ several jigs in succession for a given workpiece, which results in considerable, long and fastidious handling operations which interrupt and slow down the automatic cycle.

An object of the invention is to overcome these drawbacks by providing an assembly comprising in combination a bushing adapted to cooperate with means provided on the unit for centering the unit automatically and locking it to the bushing, this unit including means adapted to centre it in and lock it to said bushing.

The invention therefore provides an assembly comprising in combination a fixing bushing for receiving the nose of a machining unit which comprises a nose and a body, and such a unit, wherein the bushing comprises at its inlet mouth inner guide means and outer hooking means and internally, means for centering the nose of the machining unit, said unit comprising hooking elements adapted to cooperate with said hooking means of the bushing and slidable means for locking said hooking elements.

According to another feature of the invention, said inner guide means at the inlet mouth of the bushing are constituted by a peripheral chamfer.

According to yet another feature of the invention, said outer hooking means are constituted by an outer radial bead defined between a chamfered surface provided on the outer periphery of the mouth of the bushing and a peripheral groove provided in the outer surface of the bushing.

According to one embodiment, said inner centering means are formed by a roughly cylindrical first portion of the inner surface of the bushing which has a first diameter in the vicinity of the inlet mouth of the bushing, followed by a frustoconical second portion and a frustoconical third portion interconnected by their large bases, and a cylindrical fourth portion at the outlet opening of the bushing which has a second diameter a little less than the diameter of said first portion.

According to a further feature, the nose of the machining unit comprises, in the direction from the end of the unit toward the body of the unit, a peripheral chamfer, a first part having a diameter equal to the diameter of said fourth portion of the inner surface of the bushing, a second part having a diameter equal to the diameter of said first portion of the inner surface of the bushing, said hooking elements being formed by a plurality of resilient lugs axially extending from the body toward the end of the nose, each of said lugs being provided at the free end thereof with means adapted to cooperate with said outer hooking means of the bushing, and the slidable locking means comprising a sleeve axially slidably mounted on the body of the unit and surrounding said lugs.

Advantageously, said means provided at the ends of said lugs for cooperating with the outer hooking means of the bushing are formed by an inwardly and outwardly projecting thicker portion so shaped as to cooperate, on one hand, with said chamfered surface of the mouth of the bushing and, on the other hand, with said sleeve slidably mounted on the body of the unit.

The following description with reference to the accompanying drawings given by way of a non-limiting example will explain how the invention can be put into practice.

FIG. 2 is a longitudinal sectional view of a bushing which is part of an assembly according to the invention.

FIG. 3 is an end elevational view of the bushing.

FIG. 4 is a longitudinal sectional view of the front part of a drilling unit which is part of an assembly according to the invention.

Figure 1:
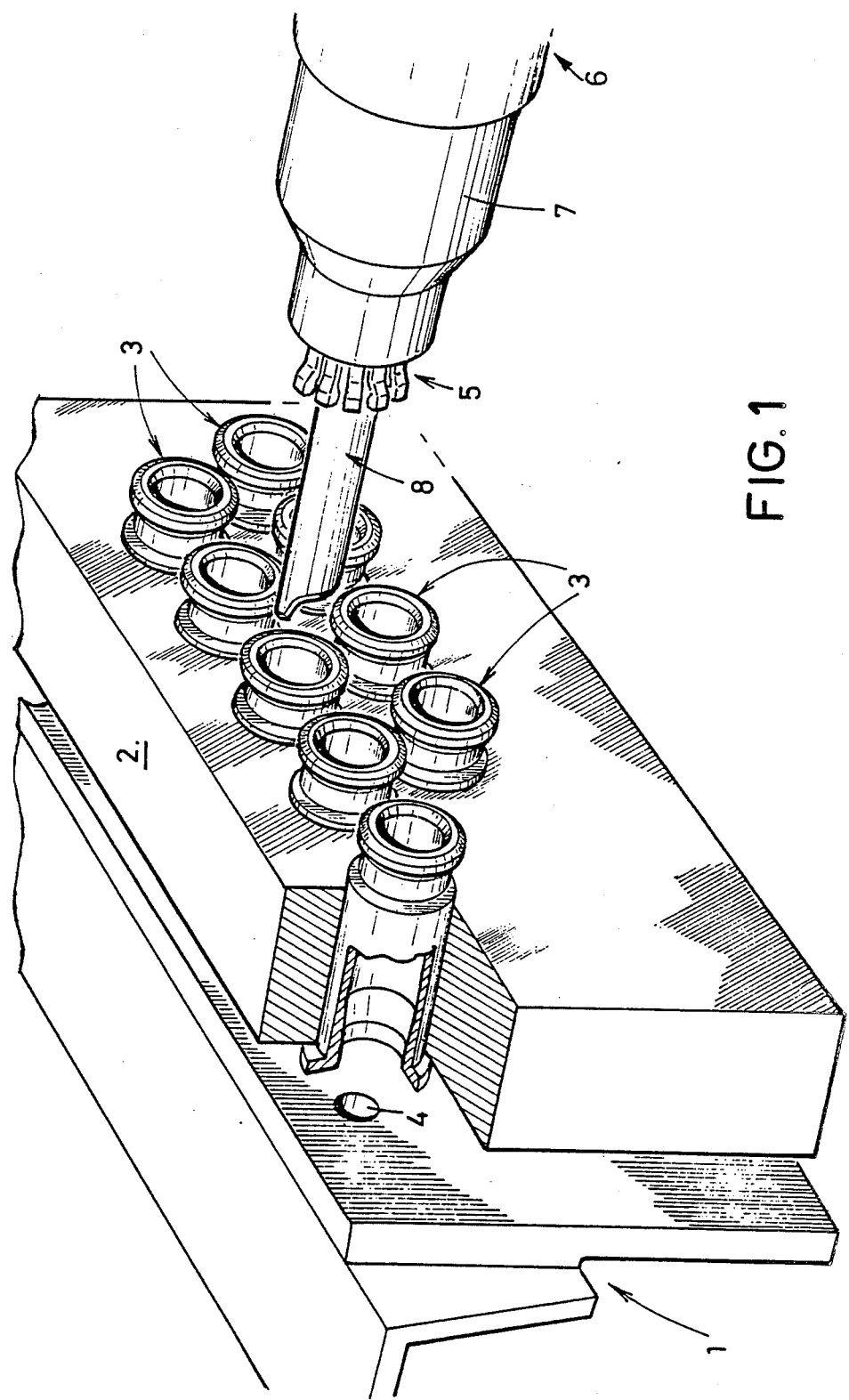
FIG. 1 is a perspective assembly view showing a workpiece which must be provided with a series of drilled holes and on which is secured a jig or grid carrying fixing bushings for drilling units, and the front part of a unit.
Figure 5:
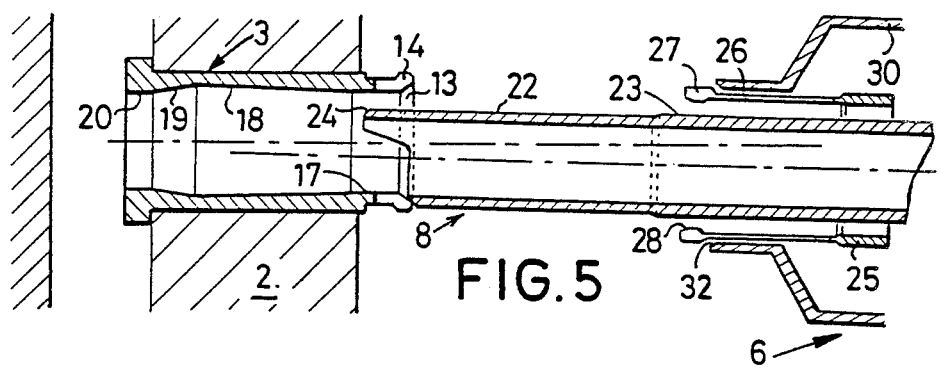
FIGS. 5 to 8 are longitudinal sectional views showing the various stages for placing in position a drilling unit in a bushing of the assembly and the locking of the unit to the bushing.
Figure 6:
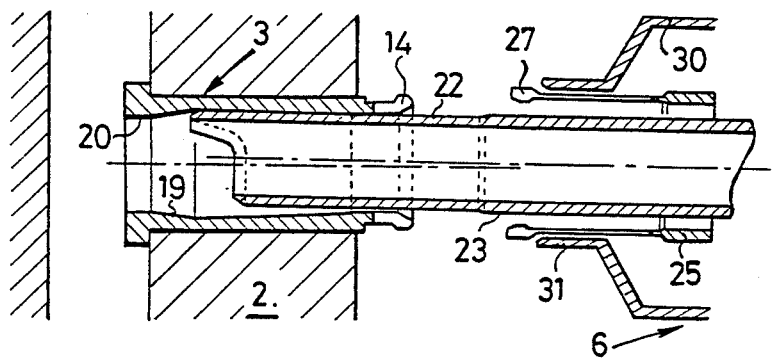

With reference to FIG. 1, there is shown a workpiece 1 to be drilled on which is secured a jig or grid 2 in which are fixed as many bushings 3 as there are holes 4 to be drilled in the workpiece 1 in positions corresponding to these holes.

Reference numeral 5 designates the front part of a drilling unit 6 which is partly shown and comprises a body 7 and a hollow nose 8 in which is slidable the tool of the unit (FIG. 4). In the known manner, the nose 8 has at its end a notch for discharging swarf.

The nose is adapted to enter each bushing 3 when the unit is locked on the bushing for each operation.

According to the invention, the bushing 3 (FIGS. 2 and 3) has a cylindrical body having an inlet end 9 and an outlet end 10 which is provided with a radial flange 11. It is retained on the jig 2 and prevented from rotating by screws (not shown) disposed in notches 12 in the flange 11. The inlet end 9 of the bushing has an inner peripheral chamfer 13 and an outer radial peripheral bead 14 which is defined, adjacent to the end 9, by an outer peripheral chamfer 15 and, in the part remote from the end 9, by a groove 16.

The inner surface of the bushing 3 has a first cylindrical portion 17 having a first diameter, followed by a frustoconical second portion 18 which is divergent toward the outlet end 10 and connected by its large base to a frustoconical third portion 19 which is convergent toward the end 10 of the bushing and followed by a fourth portion constituting a cylindrical bearing surface 20 having a second diameter which is less than the diameter of the first portion 17.

Preferably, the flange 11 of the outlet end of the bushing and the bead 14 at the inlet end may have flats or cut-away portions such as 21 (FIG. 3) so as to enable the bushings to be disposed on the jig 2 very closely together.

According to the invention, the nose 8 of the unit has a first part 22 having a diameter corresponding to the diameter of the cylindrical portion 20 of the bushing, a second part 23 having a slightly larger diameter which is equal to the diameter of the cylindrical first portion 17 at the inlet of the bushing.

The front end of the nose 8 has an outer peripheral chamfer 24 the function of which will be clear hereinafter.

The drilling unit comprises a body 7 in which the nose 8 is mounted to be slidable in the known manner to a small extent. Mounted on the nose in a fixed position is a ring 25 having a plurality of thin lugs 26 which are in one piece therewith and extend axially toward the end of the nose 8. Each of these lugs 26 has at its free end a thicker portion 27 having an inner peripheral chamfer 28 and an outwardly inclined outer ramp 29.

A sleeve 30 slidably mounted on the body of the unit has a neck 31 which surrounds the lugs 26, has an inner peripheral chamfer 32 and an inside diameter a little less than the outside diameter defined by the thicker end portions 27 of the lugs, the arrangement being such that, when the sleeve 30 is slid toward the end of the nose, its chamfer 32 comes into contact with the ramps 29 of the lugs 26 and urges the latter resiliently inwardly so that they radially approach the nose 8.

With reference to FIGS. 5 to 8, the operation of the assembly according to the invention will now be described.

When the drilling unit is presented, for example by a robot, in front of a bushing 3 carried by the jig 2 with a slight defect of alignment between the axis of the nose and that of the bushing, the chamfer 24 at the end of the nose comes into contact with the chamfer 13 at the inlet end of the bushing (FIG. 5) and slides therealong so that the insertion of the nose into the bushing is facilitated.

Figure 7:
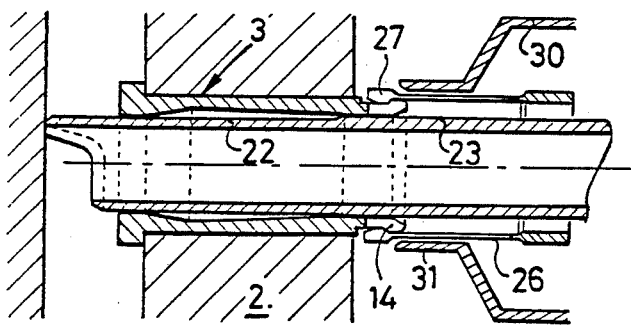
Figure 8:
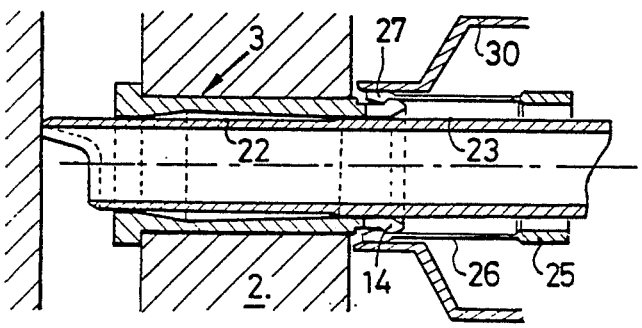

In continuing to be displaced toward the interior of the bushing, the nose 8 of the unit engages the part 22 thereof having the smallest diameter in the first portion 17 of the bushing and the chamfer 24 of the nose slides on the second frustoconical portion 18 and then encounters the third portion 19 which tapers towards the outlet end of the bushing and brings the axis of the nose back into coincidence with the axis of the bushing (FIG. 7). The first part 22 of the nose of reduced diameter is then engaged in the cylindrical last portion 20 of the bushing in which it is maintained, while its second part 23 of larger diameter is fitted in the cylindrical first portion 17 of the bushing so that the nose 8 of the unit is firmly maintained in the bushing.

In continuing to advance, the chamfers 28 of the portions 27 of the lugs slide on the outer peripheral chamfer 15 of the inlet end of the bushing, move beyond the bead 14 and are engaged in the groove 16. In the position which is then that shown in FIG. 7, the sleeve 30 is slid forwardly so that its chamfer 32, in engaging the ramp 29, returns the enlarged portions 27 inwardly so as to firmly lock them in the groove 16. The unit is then solidly locked to the bushing.

The slidable sleeve 30 is for example shifted by a suitable mechanism so as to be automatically moved forwardly for locking the unit to the bushing. This mechanism is not part of the invention and will not be described here. The unit is unlocked by a rearward movement of the sleeve 30 which releases the lugs 26 and allows them to resiliently spread apart when the unit is rearwardly pulled away.

If desired, the bushing may be partly split so as to render it slightly resilient, and abutments may be provided on its outer periphery so as to prevent the unit from rotating on the bushing. Likewise, the groove 16 could be arranged geometrically to provide an involute motion so as to produce, in addition to the guiding of the nose of the unit, a gripping force exerted by the bushing on the nose which increases with increase in the axial force due to the cutting.

What is claimed is:

1. An assembly comprising in combination a fixing bushing and a machining unit having a nose and a body, said bushing being adapted to receive said nose and comprising a bore having an inner surface, an inlet mouth provided with a peripheral chamfer, and external hooking means, and an outlet opening, said inner surface and said bushing comprising internal guide means and centering means for the machining unit, said hooking means comprising a groove, and said unit comprising hooking elements adapted to cooperate with said groove of the bushing, axially slidable locking means being provided for locking said hooking elements in position in said groove.

2. An assembly according to claim 1, wherein said groove is defined in an outer surface of the bushing by an outer radial bead provided on a peripheral portion of the inlet mouth of said bushing.

3. An assembly according to claim 1, wherein said internal guide means at the inlet mouth of the bushing comprise a peripheral chamfer.

4. An assembly comprising in combination: a fixing bushing and a machining unit having a nose and a body, the bushing being adapted to receive said nose, said bushing comprising a bore having an inlet mouth and an outlet opening, and, at said inlet mouth, internal guide means and external hooking means and, in said bore, centering means for the machining unit, said unit comprising hooking elements adapted to cooperate with said hooking means of the bushing, and slidable locking means for locking said hooking elements in position for cooperating with said hooking means of the bushing, said inner centering means comprising a substantially cylindrical first portion of the bore of the bushing having a first diameter in the vicinity of the inlet mouth followed by a frustoconical second portion and a frustoconical third portion interconnected by a large bases thereof, and a cylindrical fourth portion defining the outlet opening of the bushing and having a second diameter a little less than said first diameter, the nose of said machining unit comprising in the following order in a direction from an end of the nose toward the body: a peripheral chamfer, a first part having a diameter equal to the diameter of said fourth portion of the bore of the bushing, a second part having a diameter equal to the diameter of said first portion of the bore of the bushing, said hooking elements being constituted by a plurality of resilient lugs axially extending form the body toward the end of the nose, each of said lugs having at a free end of the lug means cooperative with said outer hooking means of the bushing, and the slidable locking means comprising a sleeve axially slidably mounted on the body of the unit and surrounding said lugs.

5. An assembly according to claim 4, wherein said means at the free ends of said lugs cooperative with the outer hooking means of the bushing comprise a thicker portion of the respective lug projecting inwardly and outwardly and so shaped as to be cooperative with said chamfered surface of the mouth of the bushing and with said sleeve.

6. An assembly according to claim 5, wherein said sleeve includes a neck having an inner peripheral chamfer cooperative with said thicker portions of the lugs, said lugs being resiliently inwardly deformable by the sleeve when the sleeve is slid axially relative to the body to a position to overlap said lugs.

7. An assembly according to claim 4, wherein the bushing comprises at least one longitudinally extending partial split.

* * * * *